United States Patent [19]

Tarplee

[11] Patent Number: 5,709,041
[45] Date of Patent: Jan. 20, 1998

[54] DEVICE FOR RECOVERING THE HEAT REMOVED BY A LOAD CONTAINED IN A CLOTHES WASHING-DRYING MACHINE OR CLOTHES DRYER AND FOR ITS REUSE FOR FURTHER DRYING SAID LOAD

[75] Inventor: Jennifer L. Tarplee, Cedar Rapids, Iowa

[73] Assignee: Whirlpool Corporation, Benton Harbor, Mich.

[21] Appl. No.: 742,524

[22] Filed: Nov. 1, 1996

[30] Foreign Application Priority Data

Nov. 3, 1995 [IT] Italy ................ MI950758 U

[51] Int. Cl.[6] .......................................... F26B 11/02
[52] U.S. Cl. ............................................. 34/595
[58] Field of Search .......................... 34/86, 595, 596

[56] References Cited

U.S. PATENT DOCUMENTS 4,151,398  4/1979  Maake ................ 219/374
4,180,919  1/1980  Baltes ................. 34/449
4,908,238  3/1990  Vigo et al. ............ 427/389

Primary Examiner—John M. Sollecito
Assistant Examiner—Dinnatia Doster
Attorney, Agent, or Firm—Thomas A. Schwyn; Mark A. Davis; Robert O. Rice

[57] ABSTRACT

A device for recovering heat during the drying of a load in a clothes dryer of the once-through external air type, said machine comprising a tub for containing a load to be dried, a conduit for feeding external fresh air into said tub, and a conduit for expelling hot moist air from this latter and for feeding it into the environment in which the machine is located. A container is provided containing a phase change material or PCM in which heat transfer surfaces or channels are present, along or within one of these latter there passing at least part of the hot moist air from the exit of the tub so as to transfer thermal energy to said PCM, which changes its physical state or phase, within another of said channels or along another of said surfaces there passing at least part of the fresh air entering the machine and to which said energy is transferred by the return of said PCM to its original physical state or phase.

7 Claims, 1 Drawing Sheet

5,709,041

DEVICE FOR RECOVERING THE HEAT REMOVED BY A LOAD CONTAINED IN A CLOTHES WASHING-DRYING MACHINE OR CLOTHES DRYER AND FOR ITS REUSE FOR FURTHER DRYING SAID LOAD

BACKGROUND OF THE INVENTION

1. Field of the Invention

This invention relates to a heat recovery device for a clothes washer-dryer or dryer.

2. Description of the Related Art

In a clothes washing-drying machine or clothes dryer of the once-through external air type, this external air is heated by usual heating means and fed into the tub in which a usual rotary drum carries a load to be dried. The air removes water from this load and becomes moist, said hot moist air then being discharged to the outside of the machine.

With such a machine there is the problem of increasing temperature and humidity of the environment surrounding the machine, with obvious problems for the user.

Various arrangements are known for reducing the release of thermal energy and moisture to said environment and at the same time achieving an energy savings in the use of the machine by transferring part of this energy to the air entering the machine, so as to heat this air and reduce the temperature difference between the air entering the heating means and the air leaving them. These known arrangements comprise air-air heat exchangers of regeneration or heat tube type and heat pump systems. Although these known arrangements achieve their purpose in a more or less acceptable manner, they result in an increase in the volume of the machine in which they are contained, with consequent problems related to the greater space required for the machine. Such arrangements are also costly and often complicated to mount in the clothes washing-drying machine or clothes dryer, resulting in a higher final machine cost and difficult maintenance.

In a clothes dryer or clothes washing-drying machine of condensation type, for recovering the thermal energy of the hot moist air leaving the tub and for transferring it to the fresh air entering this latter it is known to use a device comprising a container containing a phase change material or PCM.

These phase change materials (PCMs) possess two possible phases, namely a solid phase and a liquid phase. Such materials (salts, acids, organic materials, etc.) are generally solids and become liquid by the absorption of thermal energy. On releasing this thermal energy they return to the solid state.

Said known materials absorb or release heat or thermal energy by an isothermal process caused by phase change, such as fusion and solidification.

The known arrangement using PCMs in a clothes washing-drying machine of condensation type cannot be used in a clothes washing-drying machine or clothes dryer of the once-through external air type because of the constructional differences in the once-through air circuit and because of the need to heat the external air entering the machine, which is certainly at a lower temperature than that of the circulation air entering the heating means in a clothes washing-drying machine of the condensation type.

SUMMARY OF THE INVENTION

An object of the present invention is therefore to provide a device for recovering thermal energy within a clothes washing-drying machine of the once-through external air type which enables the temperature difference between the fresh air entering the heater and the air leaving it to be considerably reduced, and which is compact, is simple to construct, and uses a phase change material for this purpose.

This and further objects which will be apparent to the expert of the art are attained by a device in accordance with the accompanying claims.

BRIEF DESCRIPTION OF THE DRAWINGS

The present invention will be more apparent from the accompanying drawing, which is provided by way of non-limiting example and in which.

DESCRIPTION OF THE PREFERRED EMBODIMENT

Figure 1:
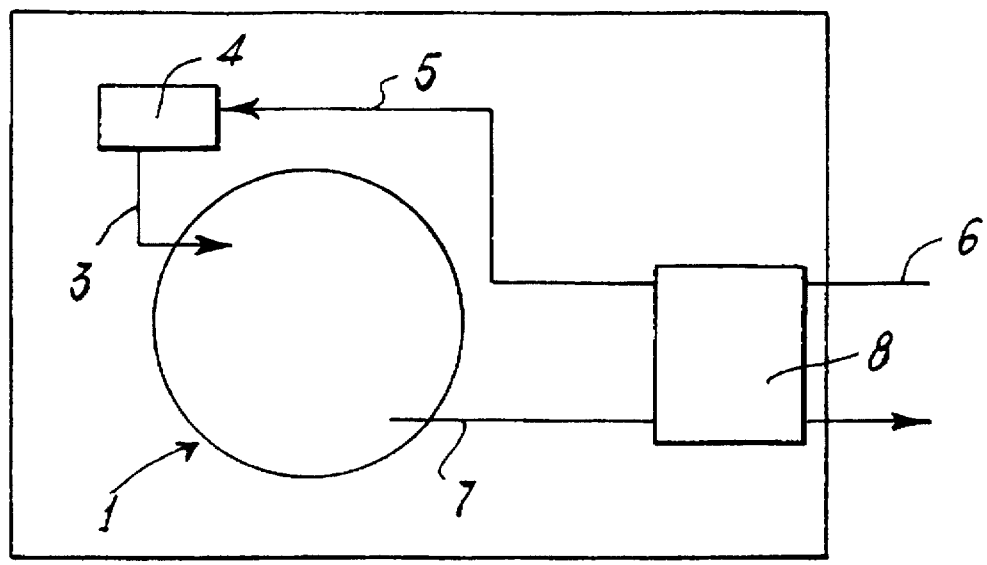
FIG. 1 is a schematic view of a first embodiment of a clothes washing-drying machine provided with the device of the invention.

With reference to said figures, a clothes washing-drying machine or clothes dryer (generally referred to as clothes dryer) comprises a tub 1 containing a rotary drum (not shown). It is connected by an inlet conduit 3 to a usual heating element, for example, of the electrical resistance element type 4. This latter is connected by a conduit 5 to an inlet 6 for fresh air originating from the environment external to the machine. A conduit 7 carrying hot moist air leaves the tub. Usual circulation means, not shown, circulate the air from the outside to the inside of the tub and then back to the outside.

According to the invention, at least part of the fresh air entering the machine and at least part of the hot moist air leaving the tub 1 are fed to a container 8 containing a phase change material or PCM. To this latter, the air leaving the tub transfers at least part of its contained thermal energy (heat) removed from the load present in the tub, said transfer resulting in a phase change of the PCM, which changes from solid to liquid. This thermal energy is transferred to the entering fresh air by the PCM returning to its initial phase (solid) to result in an increase in the temperature of this fresh air. In this manner the temperature difference between the air entering the heating element 4 and the air leaving it is reduced. Consequently the energy required to heat this air to the temperature necessary for drying the load in the tub is also reduced.

Specifically, FIG. 1 shows an embodiment in which the energy transfer between the hot air in the conduit 7, the PCM, and the entering fresh air takes place simultaneously. In this figure the container 8 is traversed simultaneously by a stream of hot air and a stream of fresh air. These streams graze opposing surfaces of parallel and, for example, superposed plates enclosing the PCM (not shown) and contained in the container 8. In this manner the hot air present in the conduit 7 transfers heat to the PCM. As a result of this the material tends to liquefy, but solidifies very rapidly on transferring this heat to the fresh air entering. Compared with a traditional heat exchanger there is the advantage that by suitably choosing the PCM there is no danger of condensation in the heat exchanger. Moreover, the energy accumulated can be preserved for the next drying operation.

The container 8 (i.e., the superposed plates present within it) may contain a single PCM or several PCMs of different phase change temperatures, chosen according to the characteristics of the exit (hot) air and arranged to optimize heat transfer from the hot air to the cold air (for example, a first PCM changing phase at a temperature T1 and positioned along the hot air path upstream of a second PCM with a liquefaction temperature T2 less than T1). In the embodiment shown in FIG. 2, in the exit conduit 7 from the tub 1 there is a valve member 12 controlled by the usual machine function control member or timer (not shown). This valve member, of three-way type, is connected to a first exit conduit 13 opening to the outside of the machine, and to a second exit conduit 14 leading to the container 8 and which, downstream of this latter, reconnects to the outlet of the conduit 13. Likewise, in the conduit 5 there is a valve member 17, controlled in the same manner as the valve member 12, which is connected to the fresh air inlet 6 and to two exit conduits 18 and 19, the first 18 being an extension of the conduit 5 and the second 19 traversing the container 8 and reconnecting downstream of this latter to the conduit 5.

In the embodiment shown in FIG. 2, the container 8 can contain either the plates described with reference to FIG. 1 or a plurality of tubes through which an air stream passes (for example the hot air stream) and which are grazed externally by the other air stream (the fresh air stream), the PCM being present in the wall of each tube.

In the embodiment under examination, energy recovery takes place in two stages. During a first stage, the hot air leaving the tub 1 passes into the container 8 before being expelled from the machine and transfers heat to the PCM, which liquefies. In this stage the valve 12 connects the conduit 7 to the conduit 14. In the second stage, the inlet air passes through the container 8 before entering the heating element 4 and absorbs heat from the PCM, which solidifies. This air is hence heated. In this stage the valve 17 connects the inlet 6 to the conduit 19.

As an alternative, in the first of said stages it is also possible for the inlet air to pass directly through the conduit 18 and the conduit 5. In the second of said stages, the air from the conduit 7 can pass directly to the exit via the conduit 13 without penetrating into the container 8.

The aforedescribed process can take place several times during one and the same drying cycle or can take place during two successive drying cycles if the second drying cycle occurs shortly after the first. In this case the first of the aforesaid stages takes place at the end of the first cycle and the energy recovery of the second stage takes place at the commencement of the second drying cycle.

Figure 2:
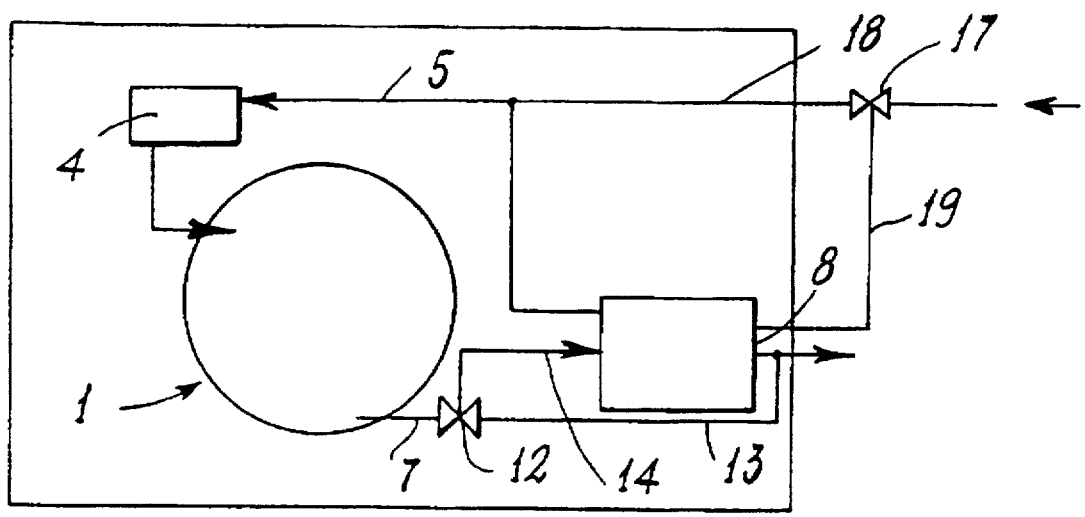
FIG. 2 shows a clothes washing-drying machine similar to that of FIG. 1 but provided with a second embodiment of the device according to the invention.

By means of the embodiment of FIG. 2, a drying process is achieved which is more rapid and more efficient than that obtainable with the embodiment of FIG. 1, although the device shown in this latter has the advantage of greater simplicity and lower constructional cost than the embodiment of FIG. 2. Moreover, in this latter an air circulation not involving the PCM can be achieved, this being useful, for example, if the air through the inlet 6 already has a high (ambient) temperature or at the commencement of the drying cycle.

According to the invention, energy can be recovered within the container 8 (i.e., within the PCM) for a subsequent drying operation even some days distant.

I claim:

1. A device for recovering heat during the drying of a load in a clothes dryer of the once-through external air type, said clothes dryer comprising a tub for containing a load to be dried, a conduit for feeding external fresh air into said tub, a conduit for expelling hot moist air from the tub and for feeding it into the environment in which the machine is located, and means for heating the fresh air, the device comprising a container containing a phase change material (PCM) in which a heat transfer area is present, at least part of the hot moist air passing into the heat transfer area from the exit of the tub so as to transfer thermal energy to said PCM, which changes its physical state or phase, and at least part of the fresh air entering the machine passing through the heat transfer area and to which said energy is transferred by the return of said PCM to its original physical state or phase.

2. A device as claimed in claim 1, wherein the PCM container is directly connected to the fresh air inlet and is also directly connected to the exit conduit from the tub in which hot air is present, the hot air stream and the fresh air stream passing simultaneously through said container.

3. A device as claimed in claim 1, wherein the PCM container is connected to the fresh air inlet via a first controlled valve member and a conduit, said container being connected to the exit conduit from the tub and into which hot air flows via a second controlled valve member and a further conduit.

4. A device as claimed in claim 3, wherein the first and second valve members are controlled by a controller which controls the operation of the clothes dryer.

5. A device as claimed in claim 3, wherein the first valve member connected to the fresh air inlet is connected to an inlet conduit to the heating means via a conduit, the second valve member connected to the exit conduit from the tub being connected to a further conduit bypassing the PCM container and connected to the hot air exit.

6. A device as claimed in claim 1, wherein the heat transfer area comprises heat transfer surfaces in the PCM with the portion of hot moist air and fresh air passing along the heat transfer surfaces.

7. A device as claimed in claim 1, wherein the heat transfer area comprises heat transfer channels in the PCM with the portion of hot moist air and the fresh air passing through the heat transfer channels.

* * * * *